Patented Jan. 29, 1924.

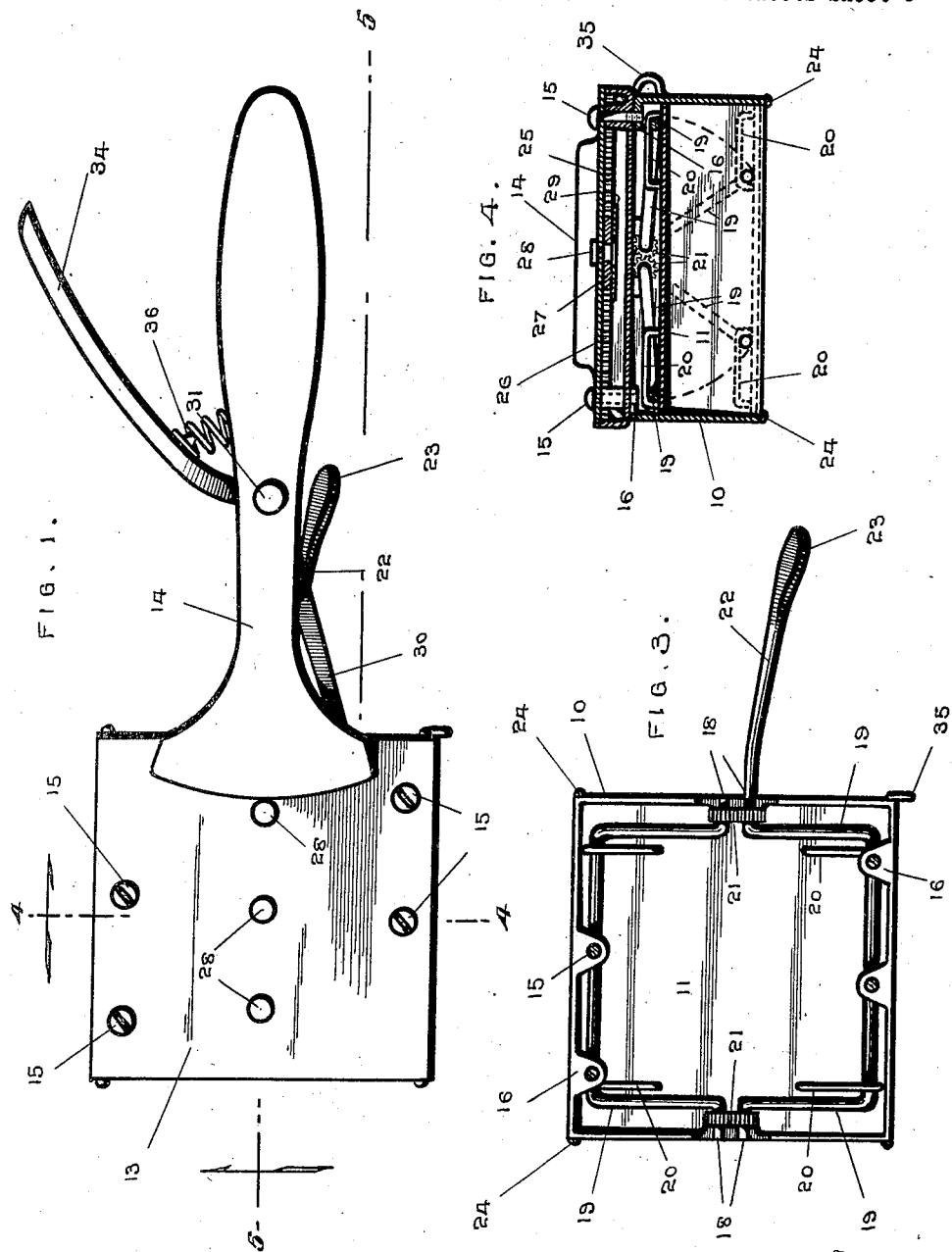

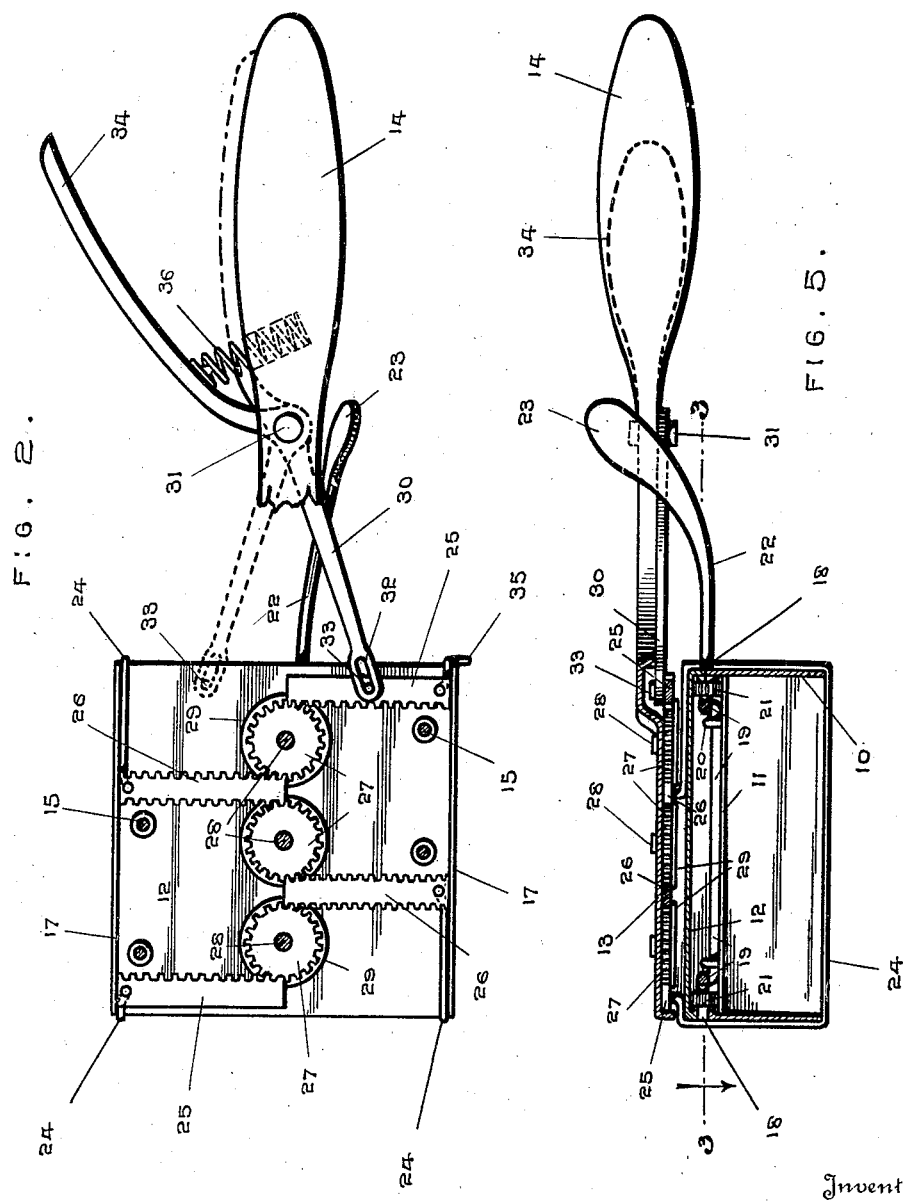

1,481,890

UNITED STATES PATENT OFFICE.

GUY M. CAUSEY, OF SALEM, OREGON.

DIPPER OR SCOOP.

Application filed June 4, 1923. Serial No. 643,309.

*To all whom it may concern:*

Be it known that I, GUY M. CAUSEY, a citizen of the United States, residing at Salem, in the county of Marion and State of Oregon, have invented certain new and useful Improvements in a Dipper or Scoop; and I do hereby declare the following to be a full, clear, and exact description of the invention, such as will enable others skilled in the art to which it appertains to make and use the same.

The present invention relates to dippers and scoops for serving ice cream and other frozen or semi-solid materials, and the invention aims to provide a novel and improved device of that kind, to be manipulated by hand, for forming and serving the ice cream or material in blocks.

Another object of the invention is to provide such a dipper or scoop having novel means for cutting off the surplus material beyond the plane of the mouth or rim of the scoop.

A further object is the provision of novel means for ejecting or discharging the block of material from the scoop.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a plan view of the improved scoop.

Fig. 2 is a plan view, with the back plate and a portion of the handle broken away.

Fig. 3 is a section on the line 3—3 of Fig. 5.

Fig. 4 is a cross section on the line 4—4 of Fig. 1.

Fig. 5 is a section on the line 5—5 of Fig. 1.

The dipper or scoop proper comprises a rectangular rim 10, having the ejector plate 11 of similar shape movable therein. A partition or division plate 12 is disposed across the rim 10 at the back thereof and abuts the rear edges of said rim, and a back plate 13 extends across and is spaced from the plate 12. The back plate 13 has the handle 14 attached thereto or integral therewith, which handle is held in the hand to manipulate the scoop. The plates 12 and 13 and rim 10 are secured together by means of screws 15 extending through said plates and engaging within inturned ears or lugs 16 with which the rim 10 is provided at its rear edge, the plate 12 being clamped against the rim 10 and the plate 13 being clamped against flanges 17 at opposite side edges of the plate 12 turned or extending away from the rim 10.

In order to operate the ejector plate 11, a pair of parallel rock shafts 18 are journaled between the plate 12 and adjacent edge of the rim 10, said plate and rim being provided with complementary bearing seats or notches for the shafts, and said shafts are provided with opposite cranks 19, the intermediate portions of which bear on the plate 11, and extend under rods 20 secured on said ejector plate. The rods 20 have their terminals secured to the ejector plate and said rods extend across the intermediate portions of the cranks, with the cranks slidable between the plate 11 and rods 20. The shafts 18 and cranks are made to turn simultaneously in opposite directions, by means of gears 21 on the shafts 18 meshing with one another, whereby the plate 11 is made to move parallel with itself within the rim 10. One shaft 18 has an arm 22 extending from that end thereof nearest to the handle 14, and said arm has a thumb piece 23 located at one side of the handle, to be conveniently pressed by the thumb of the hand grasping the handle 14, so that the cranks 19 can be turned for moving the ejector plate 11 to and from the mouth of the scoop.

The cutters for cutting off the surplus material comprise the wires or strips 24 extending across the mouth of the scoop, and across opposite walls of the rim 10 at the exterior thereof, and having terminals extending at an angle and overlapping the plate or partition 12, whereby the cutters are slidable transversely of themselves on the rim 10 and plate 12 toward and away from one another. Racks 25 and 26 are secured to the ends of the cutters 24, and mesh with the gear wheels 27 which are connected by the pivots 28 with the back plate 13. The racks 26 are double toothed so as to pass between the gear wheels, and the gear wheels are shrouded or have the flanges or disks 29 to support the racks 25 and 26 in spaced relation from the plate 12, whereby the ends of the cutters 24 can pass between the plate 12 and the gear wheels and opposite racks, in order that the cutters can move together at the center of the device.

A lever 30 is fulcrumed or pivoted between its ends, as at 31, to the handle 14, and has a slot 32 at one end engaging a pin or lug 33 on the corresponding rack 25, whereby the lever in being swung will reciprocate the racks, which are connected through the gear wheels 27, to move simultaneously. The lever 30 has a handle portion 34 at one side of the handle 14 to be grasped by the hand for swinging the lever to operate the cutters. The racks of the two cutters reciprocate in opposite directions, and when the handle portion 34 is moved toward the handle 14, the cutters 24 are moved toward one another and into contact at the center of the device, said cutters being separated when the handle portion 34 is swung away from the handle 14, by means of a coiled spring 36, or the like. The racks 25 and 26 are disposed slidably between the back plate 13 and the flanges or disks 29 of the gear wheels, making a compact arrangement.

In using the scoop, the ice cream or other material is scooped up the same as with an ordinary scoop or dipper, to fill the scoop, and the lever 30 is then operated whereby the cutters 24 are moved toward one another into contact at the longitudinal median line of the device. Those portions of the cutters which extend across the mouth of the scoop, have their edges sharpened, so that the cutters will cut away the surplus ice cream or material beyond the plane of the mouth or outer edge of the rim 10, whereby the block of cream or material in the scoop will be of uniform thickness throughout. Then, when the lever 30 is released, the spring 36 will return it to normal position, thereby separating the cutters 24, and the active portions thereof will move across the outer edges of the corresponding side walls of the rim 10, so as to be out of the way of the block of ice cream when it is ejected from the scoop. To eject the block, the thumb piece 23 is moved by the thumb, thereby turning the cranks 19 away from the plate 12, and moving the ejector plate 11 to the mouth of the scoop, thereby discharging the block. The ejector plate 11 can be returned by swinging the arm 22 back, or said ejector plate will be shoved into place when the scoop is filled the next time.

With the present device, ice cream and other semi-solid or frozen material can be dispensed or served in blocks of rectangular form and uniform thickness, and the device can be used for the production of the confection as disclosed in my application Serial No. 586,891, filed September 8, 1922. The blocks of ice cream or other material after being ejected can be coated to facilitate handling thereof and to add to the palatability of the ice cream.

Having thus described the invention, what is claimed as new is:—

1. A scoop comprising a rim, cutters extending around the rim and across the mouth thereof, racks connected with the opposite ends of the cutters, the racks of the cutters being arranged parallel with one another, gear wheels located between and meshing with said racks for moving the cutters toward and away from one another across the mouth of the rim, and means for actuating said racks and gear wheels.

2. A scoop comprising a rim, cutters extending across the mouth thereof, racks connected with said cutters, gear wheels with which said racks mesh to move the cutters toward and away from one another across the mouth of the rim, and means for actuating said racks and gear wheels.

3. A scoop comprising a rim, an ejector plate movable in said rim to and from the mouth thereof, rock shafts having cranks connected with said plate, and means for rocking said shafts to move said plate to and from the mouth of the rim.

4. A scoop comprising a rim, a pair of rock shafts journaled in said rim and having opposite cranks, an ejector plate movable in said rim and connected with said cranks to be moved to and from the mouth of the rim, said shafts being geared together, and means for turning said shafts.

In testimony whereof I have signed my name to this specification in the presence of two subscribing witnesses.

GUY M. CAUSEY.

Witnesses:
A. W. ESTES,
W. G. KRUEGER.